(12) United States Patent
Mathoy et al.

(10) Patent No.: US 10,020,702 B2
(45) Date of Patent: Jul. 10, 2018

(54) STATOR

(71) Applicant: BRUSA Elektronik AG, Sennwald (CH)

(72) Inventors: Arno Mathoy, Grabs (CH); Martin Stoeck, Azmoos (CH)

( * ) Notice: Subject to any disclaimer, the term of this patent is extended or adjusted under 35 U.S.C. 154(b) by 606 days.

(21) Appl. No.: 14/404,501

(22) PCT Filed: Jun. 21, 2013

(86) PCT No.: PCT/IB2013/055107
§ 371 (c)(1),
(2) Date: Dec. 21, 2014

(87) PCT Pub. No.: WO2013/190514
PCT Pub. Date: Dec. 27, 2013

(65) Prior Publication Data
US 2015/0102699 A1    Apr. 16, 2015

Related U.S. Application Data

(60) Provisional application No. 61/663,447, filed on Jun. 22, 2012.

(30) Foreign Application Priority Data

Jun. 22, 2012 (EP) ..................................... 12173166

(51) Int. Cl.
H02K 3/04    (2006.01)
H02K 3/14    (2006.01)
(Continued)

(52) U.S. Cl.
CPC .................. *H02K 3/14* (2013.01); *H02K 1/16* (2013.01); *H02K 1/165* (2013.01); *H02K 15/063* (2013.01);
(Continued)

(58) Field of Classification Search
CPC ......... H02K 33/00; H02K 33/12; H02K 33/14
See application file for complete search history.

(56) References Cited

U.S. PATENT DOCUMENTS 5,587,619 A    12/1996  Yumiyama et al.
6,770,999 B2 *  8/2004  Sakurai ................... H02K 3/12
                                                  310/201

(Continued)

FOREIGN PATENT DOCUMENTS

DE    4031276 A1    4/1992
DE    4343025 A1    6/1994
(Continued)

OTHER PUBLICATIONS

International Search Report and Written Opinion, dated Oct. 29, 2013, from parent PCT/IB2013/055107; in English.
(Continued)

*Primary Examiner* — Dang Le
(74) *Attorney, Agent, or Firm* — Hoffmann & Baron, LLP

(57) ABSTRACT

A stator having slots separated by stator teeth, into which shaped bars, formed from a plurality of individual wires, are deployed, wherein in each case sidewalls of a stator tooth bounding adjacent slots in a region of the shaped bars run essentially parallel to one another.

8 Claims, 8 Drawing Sheets

(51) Int. Cl.
*H02K 1/16* (2006.01)
*H02K 15/06* (2006.01)

(52) U.S. Cl.
CPC ........ *Y02T 10/641* (2013.01); *Y10T 29/49009* (2015.01)

(56) References Cited

U.S. PATENT DOCUMENTS

| | | |
|---|---|---|
| 7,135,793 B2 | 11/2006 | Seguchi et al. |
| 7,642,667 B2 | 1/2010 | Wobben |
| 8,143,752 B2 | 3/2012 | Altindis |
| 2002/0050395 A1 | 5/2002 | Kusumoto et al. |
| 2005/0168096 A1* | 8/2005 | Joho ........................ H02K 3/14 310/213 |
| 2009/0100665 A1 | 4/2009 | Berger et al. |
| 2009/0140596 A1 | 6/2009 | Kaiser et al. |
| 2010/0102664 A1 | 4/2010 | Chen et al. |
| 2010/0213781 A1 | 8/2010 | Rahman et al. |
| 2010/0289355 A1 | 11/2010 | Baenziger et al. |
| 2011/0210558 A1 | 9/2011 | Stiesdal |
| 2012/0274172 A1* | 11/2012 | Koga ...................... H02K 3/12 310/208 |

FOREIGN PATENT DOCUMENTS

| | | |
|---|---|---|
| DE | 102005032965 A1 | 3/2007 |
| DE | 102006038582 A1 | 2/2008 |
| DE | 202007014169 U1 | 4/2008 |
| EP | 1930918 A1 | 6/2008 |
| EP | 2112747 A1 | 10/2009 |
| EP | 2362526 A1 | 8/2011 |
| JP | 2005-130667 A | 5/2005 |
| JP | 2006-230081 A | 8/2006 |
| JP | 2007-060743 A | 3/2007 |
| JP | 2008-187875 A | 8/2008 |
| JP | 2009-011148 A | 1/2009 |

OTHER PUBLICATIONS

European Search Report and EPO preliminary report on patentability dated Dec. 19, 2012 from priority EPO application No. EP12173166; in German.

Eyer, Florian. Bachelor's Thesis: Wettbewerbsanalyse elektrischer Traktionsmaschinen für Elektro-und Hybridfahrzeuge, from Hochschule Heilbronn, Heilbronn Germany; dated Jul. 21, 2011, Matriculation No. 168623; 140 pp., in German language; Comment: see also pp. 131-133 where U.S. patents cited/mentioned.

* cited by examiner

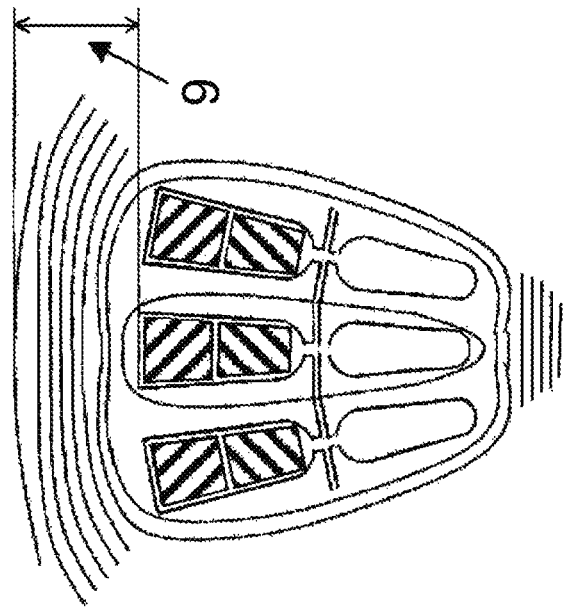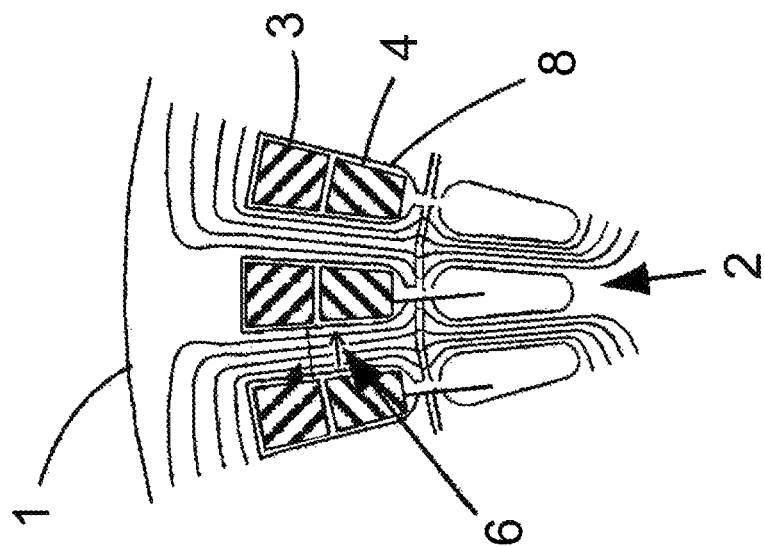
FIG. 3A
FIG. 3B

STATOR

CROSS-REFERENCE TO RELATED APPLICATIONS

This application is a 35 U.S.C. 371 national-phase entry of International application no. PCT/162013/055107, filed on Jun. 21, 2013, which claims priority to European application no. EP12173166, filed on Jun. 22, 2012, and claims benefit of U.S. provisional application Ser. No. 61/663,447, filed on Jun. 22, 2012, all of which incorporated herein by reference in their entireties for all intents and purposes, as if identically set forth in full herein.

BACKGROUND

Field

The invention concerns a stator for an electrical machine, in particular a rotating field machine, such as a motor or a generator, in particular for an electric vehicle, wherein the stator has a plurality of slots along its circumference separated by stator teeth, into which slots are deployed shaped bars, formed from a plurality of individual wires. The invention also concerns an electric motor with such a stator, and a method for the manufacture of a stator.

Brief Discussion of Related Art

The present invention relates in particular to a rotating field machine of any type of rotor build (asynchronous machine, synchronous reluctance machine, current-excited synchronous machine, hybrid-excited synchronous machine and permanently-excited synchronous machine) which in their mechanical dimensions, power output, and range of rotational speeds, have been optimised in particular to the needs in electric axle drives of road vehicles.

Common to all these types of machines is the stator, which carries the winding supplied by the inverter. The invention improves not only the efficiency and the thermal continuous output capability of all the motors cited, but in particular also the automated manufacturability of the winding.

As a winding, a distributed winding is, for example, known prior art. In order that these drive machines achieve high system efficiency and very low level of torque ripple, the so-called distributed winding has established itself as the stator winding for drive machines of road vehicles in the power output range above 70 kW. A prerequisite for this type of winding is that the number of stator slots must be equal to the product of the number of poles multiplied by the number of phases, or a multiple of the latter. For a 4-pole machine with 3 phases, 12, 24, 36, . . . slots must therefore be accommodated in the stator, correspondingly for a 6-pole machine, 18, 36, 54, . . . slots must be accommodated in the stator, and so on. The multiplier between the product of the number of phases multiplied by the number of poles and the actual number of slots accommodated is called m, and for distributed windings m must accordingly always be a natural number.

In build sizes, such as those that come into consideration as main drive machines for vehicles, the value of m for 4-pole machines is usually three, and less often four, in the case of 6-pole machines almost always three, in the case of 8-pole machines two or three, and in the case of 10 and 12-pole embodiments almost always two. Still higher numbers of poles are unusual in fast running drive motors and in terms of today's prior art are also not sensible, because what is only a small further gain in torque density via the reduction of the yoke thickness of the stator is opposed to the necessarily high supply frequencies and the outlay connected with the latter, associated with the inverter.

However, in hybrid applications and racing applications, higher numbers of poles do sometimes occur. These machines, now with 14 to 24 poles, are embodied with m=1 or 2 depending upon the external diameter. Very often, however, the transition is also made to a single-tooth winding (concentrated winding), wherein m becomes a fractional number.

Advantages and disadvantages of the distributed winding are explained briefly in what follows. The essence of the distributed winding is that the magnetic excitation, as a result of the spatial distribution of the conductors through which the current flows, assumes a distribution that is as close as possible to a sinusoidal distribution. This is the prerequisite for a high quality of smooth running, that is to say, a very low torque ripple, and for a small content of flow pulsations in the rotor, which would cause high additional losses.

Even though the distributed winding dominates in industrial motors of similar build size, it has acquired a reputation of poor manufacturability. The high manual work content encourages many manufacturers to move the production sites into low wage countries.

In particular with regard to highly automated production, something that is essential for the relatively high automotive numbers as well as for reasons of quality, it is primarily the steps in the process of wiring the individual coils that prove to be only partially suitable for use in mass production. This fact forms the basis for one of the significant, but also one of the most underrated, barriers to the widespread propagation of electric vehicles.

While there are examples of fully automatic winding processes, consisting of coiling machines for pre-forming the coils from individual wires, machines for feeding the coils into the slots and wiring cells, compromises in winding symmetry, slot fill factor, and thus power output density must be accepted in achieving this automation.

In traction drives, the problem is exacerbated by the fact that the absolute currents, due to the voltage levels and power densities that are greater by orders of magnitude compared with industrial motors, lead to significantly more individual wires running in parallel, which leads to a further complication of the production process. It is not even certain that the manufacturing processes that are currently available can be fully applied to automotive traction motors.

A comparison of motors in the range from 200 mm to 250 mm stator diameter (axle drive motor) shows the following. In order to clarify the difference between industrial standards and the requirements in vehicle build, an example is cited of a motor that has been implemented.

A 6-pole motor with a 240 mm stator diameter (build size IEC 160), for an automotive axle drive with an active mass of 36 kg, achieves between 4500 rpm and 13000 rpm, a power output of more than 100 kW (65 kW continuous). Here, the peak torque is 280 Nm (over 30 secs) and the continuous torque (below 5500 rpm) is approximately 120 Nm.

The same build size equipped with the same active mass and embodied to industrial standards runs when in mains network operation at a constant 1000 rpm, and thereby achieves a maximum of 10%, with optimum cooling conditions perhaps 15%, of the power developed by the traction drive motor. When in inverter operation, the range of rotational speeds does increase, but the power output data remain of the same order.

In what follows, the principle of shaped bar winding will be described in more detail. The engineering of sliding shaped bars into the slots and connecting these appropriately at their faces originates from large machine builds and is there established as a standard. However, the terminal voltage of these machines is 10 kV to 50 kV, because good manufacturability only ensues if all bars are connected in series. The terminal voltage achieved may also ensue as a consequence of the winding, because each generator must in any event be connected to a transformer on the distribution network. Thus, the adaptation of the voltage does not present a problem.

This technology however cannot be scaled down to small builds without further work, because the induced voltages in the few slots per pole and phase are insufficient by far to achieve the supply voltage by direct series wiring. An adaptation of any kind to the impressed and standardised network voltage is not sensible because of cost pressures.

For this reason, the windings of smaller motors contain many windings per slot, which later are wired appropriately in groups in parallel or in series. Shaped bar windings with exactly 2 bars per slot are therefore not used for industrial motors in the IEC 132-IEC 160 range of build sizes.

In traction motors, for electrical road vehicles, similar considerations are present. Any adaptation of the battery voltage, which while not standardised for reasons of semiconductor physics is in the region of 400 V, via DC converters is likewise neither efficient nor cost optimal.

Nevertheless, in the case of build sizes of between 200 mm and 250 mm stator diameter, the situation arises, as a consequence of the high rotational speeds, that with a suitable selection of build length, the required number of windings in the slot corresponds exactly to the number of poles. In this case, shaped bar winding is possible, which, however, leads to very restricted degrees of freedom with regard to build size, level of rotational speed, nominal battery voltage, and numbers of poles. The foregoing results in a rather generic drive motor, the specifications of which cannot be manipulated to any great extent.

Because today's car manufacturers have not been used to such standard solutions in the drive train up to the present time, previous embodiments with shaped bar windings have been limited primarily to hybrid drives, in which it appears that the parameter of battery voltage may be selected within wider limits. As conditioned by the usually significantly larger motor diameter in the gearbox flange and the very short build length, the number of poles becomes the freely selectable parameter. The efficiency of the machine itself plays a minor role; its action is based on the load point displacement of the combustion engine, which by virtue of the increase of its inherently low system efficiency of approximately 20% to 25% also more than compensates for a relatively inefficient machine with only 85% instead of 92%.

In addition, the embodiment with shaped bars usually also requires technical compromises in the form of a battery voltage that is suboptimal for power electronics, because usually too low, or the deployment of DC/DC converters.

In what follows, the principle of chorded windings is examined. If the number of slots in the stator amounts to more than double the product of the number of slots and the number of poles, it is conceivable to divide up the coils of a phase that run in one slot such that they are distributed in an overlapping manner with the other phases on, for example, four instead of three slots. Thereby, instead of three, only two, "pure" slots are formed, through which flows the current of only one phase. On two of these slots, there then follows in each case, one through which currents of different phases flow.

Chorded windings always require two coil layers, which in one slot must be insulated from one another, which further subtracts from the otherwise deep level of fill in the case of distributed windings. For this reason, traction motors are usually embodied with a single layer winding. A somewhat higher torque ripple and noise generation are accepted in favour of the power density.

However, shaped bar windings are inherently made up from two layer windings. The high level of fill that can be achieved with them now also moves the advantage of the chorded winding into the focal point of interest.

In the prior art, there is a very wide variety of stator arrangements of known art. For example, the following documents should be mentioned: JP2005-1 30667A, JP2007-060743A, JP2008-187875A, JP2009-011148A, DE4031276A1, US713579362, DE102005032965A1, US2009/0100655A1, DE102006038582A1, US2010/0289355A1. In addition to winding schemes, some of these documents also concern the connection of the windings at the faces of the stator.

In the prior art, the slots that accommodate the windings, i.e., the shaped bars, are formed by parallel sidewalls. The stator teeth separating the slots thus have in each case sidewalls that are inclined towards each other such that the cross-section of the stator teeth tapers in the direction of the rotor. Expressed in other words: in cross-section the base of a stator tooth is wider than its tip. In particular, but not only, in the case of the above described electrical machine, there now ensues as a result of the cross-sectional profile of known art of the stator teeth provided in the stator, which teeth separate adjacent slots from one another, a suboptimal utilization of the geometrical possibilities with regard to an optimisation of the magnetic flux and thus the torque. A greater disadvantage that accompanies the latter is the fact that the torques are too low for prescribed excitation power levels.

JP 2006-230081A shows stator teeth with parallel sidewalls. Within the slots there are windings, each of them formed by a bundle of wires, whereby the configured wire bundle is adapted to the contour of the slot and thus forms a shaped bar at least within the slot.

EP 1930918A2, too, discloses a stator with stator teeth which show parallel sidewalls. The windings consist of wire bundles, which fill out the slots.

Between the stator teeth of EP 2362526A1 there is provided a plurality of wires with trapezoidal cross section. The geometry of the cross section varying along the axial direction, results in a cross section of constant area. The disclosed wires, however, are not shaped wires in the closer sense, at least not shaped wires made from a plurality of wires twisted with each other.

SUMMARY

The invention addresses the task of eliminating the disadvantages and providing a stator, whose efficiency in conjunction with electrical machines, in particular rotating field machines, is improved in comparison to stator arrangements of known art. The geometrical conditions are thereby to be designed such that an optimal flux path ensues and an accompanying best possible increase in torque is achieved. At the same time, the heat development in the windings is to be easier to control, and removed more efficiently. Moreover, the manufacture, in particular, the processes of connecting the shaped bars at the faces of the stator, is to be improved and simplified.

This objective is achieved with a stator of the type cited in the introduction, in that the shaped bars are formed from a plurality of individual wires twisted with each other, each of the two sidewalls of the stator tooth, which bound the adjacent slots, run essentially parallel to one another at least in the region of the shaped bars, at least two shaped bars sit one above another in the slot, and the shaped bars sitting in the slot in each case have essentially the same cross-sectional area, but different shapes, and both shaped bars are electrically insulated from one another in their course through the slot, but are at least indirectly serially connected with one another via at least one winding. Running essentially parallel to one another means that, for the two sidewalls of the stator tooth which bound the adjacent slots, deviations of up to 10 degrees could occur. Essentially, having the same cross-sectional area for the shaped bars means that one area is within 90% of the other area.

The result of the parallel contour of the stator teeth is that all regions of the flux path are equally highly loaded magnetically, and in the event of a further increase of the flux, enter as uniformly as possible into saturation. In accordance with the invention, this can be achieved with a parallel stator tooth contour. For inverter operation in particular, a very sharply bounded transition into the saturation region is desired. This delivers high torque with, at the same time, less excitation power supplied via the stator. This requires that all regions of the stator permeated by the flux are equally highly controlled, and can be achieved by the inventive solution.

The shaped bars form the winding of the stator, i.e., represent the part of the winding permeating the stator.

At the same time, the material (iron) cross-section of the stator can be minimised, since now what is otherwise a wide base of the stator teeth is no longer present in the invention. In the case of highly utilised machines for traction drives, the requirement for as small an iron cross-section as possible weighs heavily.

Shaped bars include a multiplicity of individual wires twisted together. Usually, each of the individual wires, e.g., of copper, is surrounded with an insulating lacquer coating. The stranding and twisting, and post-forming into the desired shape, causes the individual wires with their lacquered coatings to be pressed together. The lacquered coatings of adjacent individual wires adhere together, i.e., provide adhesion that lends stability to the shaped bars as a whole. Additionally, or in the case of other metals, e.g., aluminium, which are covered by an insulating oxide coating, the twisted individual wires can be impregnated with an adhesive, e.g., a resin. Improved stability can also be achieved by this measure.

With the at least two shaped bars sitting closely above one another in a slot, complex winding schemes can also be brought into effect. Moreover, these shaped bars are electrically insulated relative to one another in their course along the slot and are preferably at least indirectly serially connected with one another via at least one winding.

Due to the shaped bars, each with essentially the same cross-sectional area, the same resistance is presented to the excitation current everywhere. At the same time, accurate matching of the shaped bars to the slot shape for both bars is achieved by the different geometry of the shaped bars. In geometrical terms, the cross-sections of the two shaped bars are not congruent and are not similar. However, this does not mean that the two shaped bars cannot both have a trapezoidal cross-section. It simply means that the trapezoidal shape of one shaped bar differs from the trapezoidal shape of the other bar (differing side and height relationships).

Preferably, the shaped bars include an arrangement of at least two layers of a plurality of twisted and grouted individual wires, the layers lying one above the other, wherein each of the wires comes to lie at the surface of the respective shaped bar, the features leading to an ameliorated cooling of the shaped bars.

In one version, the shaped bars are designed such that they in each case sit closely against the opposing sidewalls of a slot formed from two adjacent stator teeth. This accurate matching to the slot shape, at least in the lateral region of the shaped bars, possesses the following advantages. On the one hand, a very good thermal conduction between shaped bars and stator is achieved as a result of the close contact, so that the thermal aspects of the motor can also be well controlled. On the other hand, in the manufacture, the downstream processes connecting shaped bars on the face of the stator can be significantly more simply configured as a result of this accurate matching of the shaped bars to the slot shape. The connection processes regularly represent a significant thermal and mechanical loading of the conductor material. By virtue of their form-fit accommodation in the slots, the shaped bars are, however, not only well fixed in place, but also conduct generated heat away directly to the stator material, as a result of which manufacture can be better controlled via the close contact. In conclusion, as a result of the close contact, the space available in the slots is utilised in the best possible manner, as a result of which an increase of efficiency is achieved with the same build size.

In one version, the shaped bars in each case have a trapezoidal cross-section. As a result, an accurate matching of the shaped bars to the slot shape formed by the inventive stator teeth (with parallel sidewalls) can take place, which in particular, leads to the improved thermal contact already mentioned.

In one version, the individual wires that form a shaped bar are multiply stranded and preferably also grouted. This stranding is advantageous so as to reliably prevent domains from forming in the cross-section that run predominantly in the interior of the shaped bar. Such domains would otherwise prevent homogeneous subjection to the excitation power.

In one version, the shaped bars are cold formed, preferably by a rolling process and are preferably provided with pre-bent end portions. This takes the form of a cost-effective method, which at the same time is beneficial for the individual wires running in the shaped bar. The pre-bent end portions of the shaped bars, the step done before the shaped bars are introduced into the slot of the stator, makes the following step of wiring of the bars more easy.

The above-specified objective is also achieved by an electric motor, in particular a rotating field machine, in particular for an electric vehicle, with a stator and a rotor, in that the stator is designed in accordance with one of the above specified forms of embodiment.

In one version, the pole length is between 50 mm and 120 mm, and the slot cross-sections are preferably between 80 $mm^2$ and 150 $mm^2$. It has been shown that the inventive embodiment of the slots and shaped bars delivers particularly good results for a drive motor with a pole length of between 50 mm and 120 mm, and slot cross-sections of between 80 $mm^2$ and 150 $mm^2$.

From the inventive recognition that, in the case of highly utilised motors with a pole length of between 50 mm and 120 mm, the slot shape cannot be embodied in a rectangular form, the requirement arises that in a shaped bar winding the cross-sectional surface area of the conductor bars should be accurately matched to the slot shape. While the two shaped bars of a slot have the same cross-sectional surface area, they do not have the same shape.

Other than in the case of large machines, in the case of machine sizes for automotive traction drives, one cannot afford to configure the slot shape such that it can accommodate conventional rectangular shaped bars.

The above-specified objective is also achieved by a method for the manufacture of a stator, in that in the formation of a shaped bar, the individual wires are multiply stranded and preferably also grouted.

The shaped bar is permeated by diverse magnetic fields (stray fields, rotor fields, . . . ). Since the shaped bar is electrically short circuited at both ends by the electrical connections between the shaped bars, a conducting loop is formed between the individual conductors in a shaped bar. A voltage is induced in this conducting loop by the field that is present. The parasitic currents in the conducting loop that result from the induced voltages should prove to be as low as possible. For this reason, care must be taken to ensure that the stranding and twisting of a shaped bar preferably corresponds as closely as possible to a whole number factor of the slot length in the stator.

The lay length is to be understood as the length of a twisted conductor over which a complete rotation (360° mech. degrees) of the conductor is distributed about its own longitudinal axis. The slot length in the stator in the context of the invention is defined as follows: the slot length in the stator is defined as the distance between the centre of the slot opening on side A of the stator to the centre of the slot opening of the same slot on the opposing side B. In order to optimise the inventive action of the motor, the stator length preferably constitutes a whole number multiple of the lay length.

The shaped bars include a number of mechanically multiply-stranded electrically insulated individual wires, whose diameter preferably lies in the range between 0.4 mm and 0.6 mm. This stranding is necessary in order to prevent domains from forming in the cross-section that run predominantly in the interior of the shaped bar.

The central frequency conductor obtained in this manner, which can include copper, but also aluminium wires, is then cold formed in a continuously running multiple rolling process to the desired cross-sectional shape. Here, the insulation of the individual wires is provided such that, after the forming process, it ensures a microscopically small spacing between the individual wires.

In one version, the shaped bars are formed with a trapezoidal cross-section.

In one version, the shaped bars are cold formed, as a result of which the forming step can be particularly simply configured.

In one form of embodiment, the shaped bars are formed by a rolling process, preferably by a continuous multiple rolling process. A rolling process has proved to be particularly beneficial for the individual wires. Moreover, this rolling process can be further optimised by a multiple rolling process. The accommodation of the rolling method in an endless process provides an optimised method of manufacture with low costs, a high level of automation and a high output.

A further advantageous variant of the method in accordance with the present invention is characterized in that, the ends of the shaped bars are pre-bent before they are introduced into the slot of the stator, making the following step of wiring the bars more easy.

The individual shaped bars are preferably connected with one another using a resistance welding method.

Further advantages, features, and details of the invention ensue from the following description, in which examples of versions of the invention are described with reference to the figures.

BRIEF DESCRIPTION OF THE DRAWINGS

The reference symbol list is a component of the disclosure. The figures are described in a connected and comprehensive manner. The same reference symbols denote the same parts, while reference symbols with different indices specify parts with the same or similar functions.

In the figures:

FIG. 3 shows a detail scrap section of an inventive stator;

DETAILED DESCRIPTION

Figure 1:
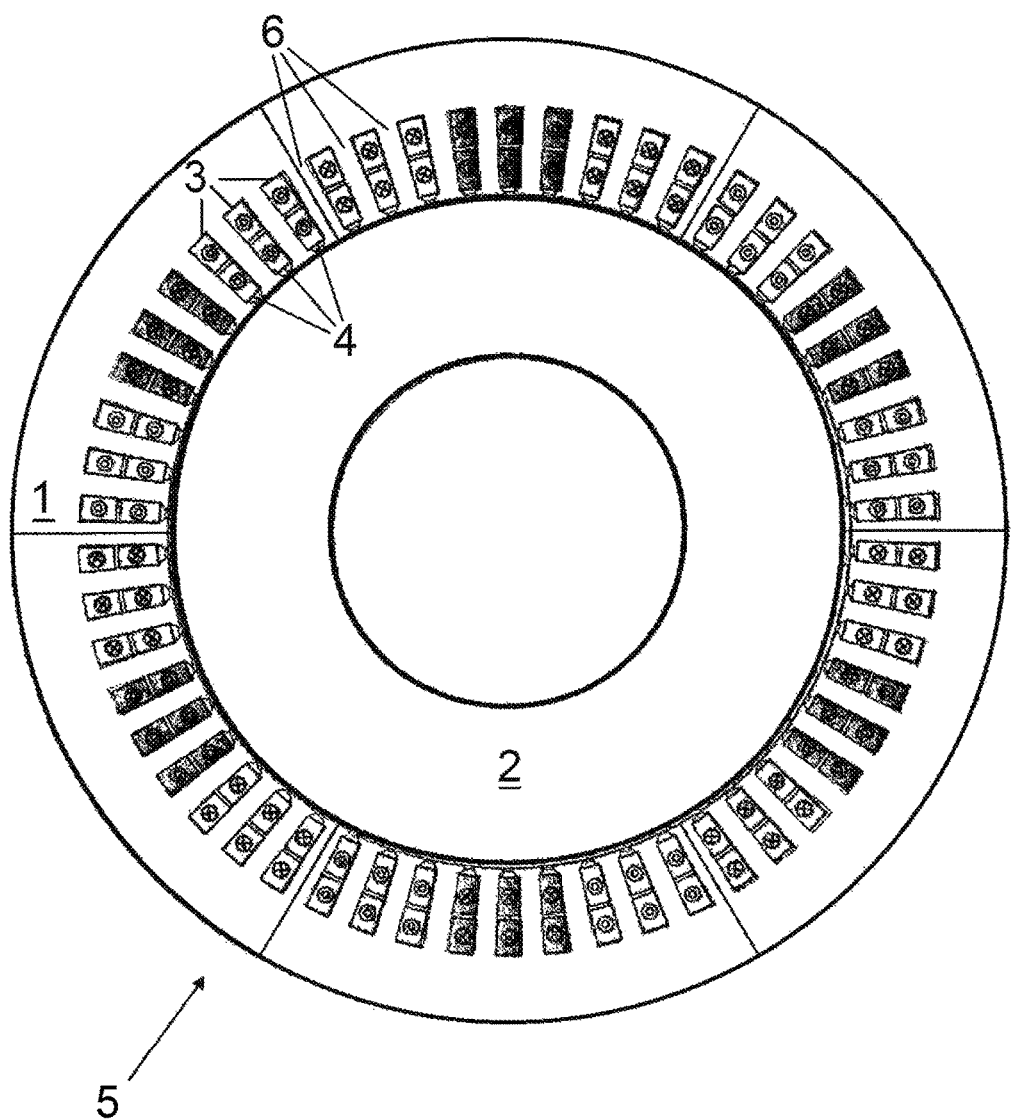
FIG. 1 shows a motor with a stator designed in accordance with the invention.
Figure 4:
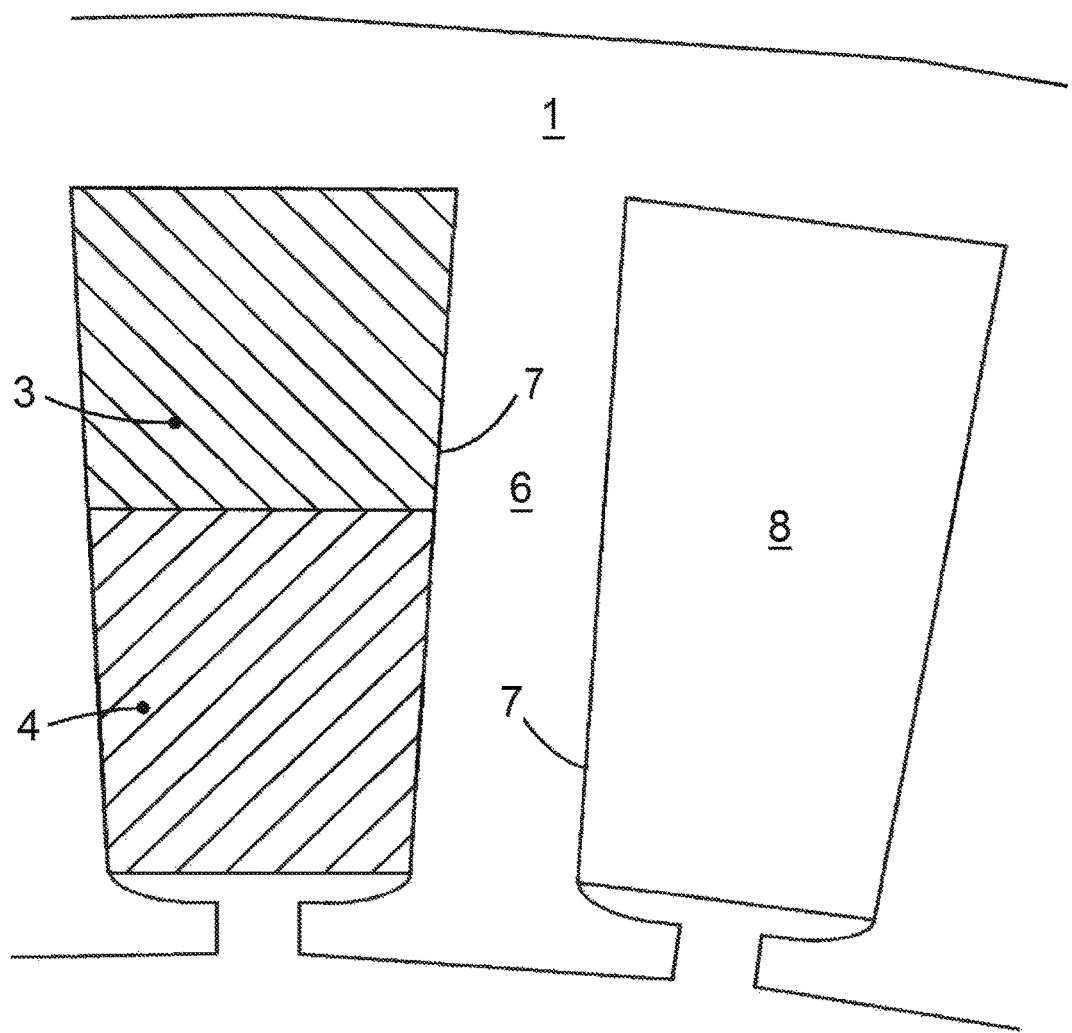
FIG. 4 shows the design of a stator tooth with adjacent slots, of which one is already occupied with shaped bars.

FIG. 1 shows an electric motor 5 with a stator 1 and a rotor 2 surrounded by the stator 1 in cross-section, and normal to the rotor axis of rotation. The stator 1 includes along its circumference a multiplicity of slots 8, which are separated from one another by stator teeth 6 (FIGS. 3 and 4). In the present example, the motor 5 takes the form of a rotating field machine with 3 phases and 6 poles. In total, the windings are distributed onto 54 slots in this example. Nine slots 8 are therefore provided per pole. Two shaped bars 3, 4 that are insulated from one another are in each case deployed in each slot 8 (FIGS. 3 and 4). The shaped bars 4 that face towards the rotor 2 form the upper layer and are also called upper bars. The shaped bars 3 that sit deeper in the slots 8 and face away from the rotor 2 form the lower layer and are called lower bars.

FIGS. 3A and 3B show in each case a segmental section of an inventive motor 5 with different magnetic field distributions. In the left-hand figure of FIG. 3A, one sees the field lines above a magnetic pole, while the right-handed figure of FIG. 3B shows the field lines in the centre of a magnetic pole.

In principle, the same operating points are being represented in the same motor.

Both sidewalls 7 of a stator tooth 6, which demarcate adjacent slots 8, in the region of the shaped bars 3, 4 run essentially parallel to one another (FIG. 4). As a result, as may be seen from the flux lines that have been plotted, an almost homogeneous magnetic loading of the stator material ensues, in particular, in the region of the stator teeth 6. Almost all regions of a flux path have a homogeneous flux density. As a further consequence, this leads to the fact that in the event of a further increase of the flux, the stator regions permeated by the flux enter into saturation almost uniformly. The parallel flux lines along the stator tooth 6 are a direct consequence of the parallel sidewalls 7 of the stator tooth 6. A yoke height of the stator 1 is designated as reference no. 9.

Figures 2A, 2B:
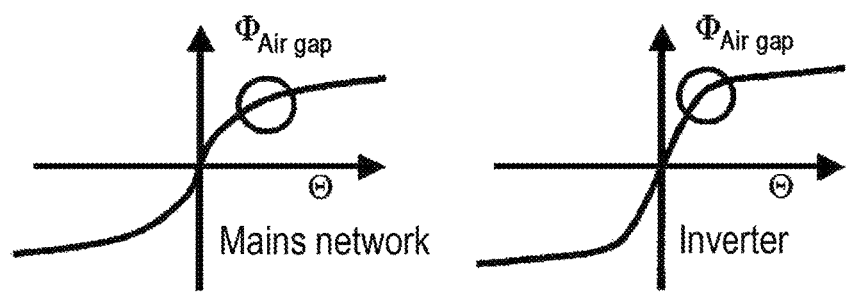
FIG. 2 shows in a schematic representation of the flux permeating the stator in the saturation region.

FIGS. 2A and 2B show the saturation curves for two different types of motors: on the left-hand side of FIG. 2A in mains network operation; and on the right-hand side of FIG. 2B in inverter operation. Along the vertical axis is plotted the flux running in the air gap between stator 1 and rotor 2, while along the horizontal axis is the torque. The left-hand type of motor of FIG. 2A corresponds to a conventional motor. The right-hand type of motor of FIG. 2B corresponds to the invention. In the case of this inventive type, one detects in contrast, a very sharply bounded transition into the saturation region. This shows the sudden saturation characteristic of motors of a build type. This is advantageous since the motor thus operates faster in the optimal power region. This ensues primarily on account of the inventive stator section, which in accordance with the invention has been optimized for inverter operation. For this, one wants a very sharply bounded transition (right-hand diagram of FIG. 2B) into the saturation region (as highlighted by the circle). This delivers a high torque, at the same time with less excitation power supplied via the stator 1. This requires that all regions of the stator 1 permeated by the flux are equally highly controlled. In accordance with the invention, this is achieved by parallel contours in the stator tooth region. In order to achieve further optimisation, the slots 8 of trapezoidal design, by virtue of the design of the stator teeth 6, are filled in the best possible manner with shaped bars 3, 4.

In the version represented, the shaped bars 3, 4 are designed such that in each case they sit closely against the opposing sidewalls 7 of the slot 8 formed from two adjacent stator teeth 6. This can also be seen in FIG. 4 in detail. In order to fill in the best possible manner the slots 8 formed by the stator teeth 6, which in each case have sidewalls 7 aligned parallel to one another, the shaped bars 3, 4 in each case have a trapezoidal cross-section. As can be seen in FIG. 4, the cross-section of the stator teeth 6 can diverge underneath the shaped bars 3 and 4. However, what is important for the invention is the fact that the two sidewalls 7 of the stator tooth 6 run essentially parallel to one another, at least in the region of the shaped bars 3, 4.

The shaped bars 3, 4, sitting in the slot 8 in different layers, preferably have essentially equal cross-sectional areas, so that the excitation current encounters the same resistance in all shaped bars 3 and 4. That means that the shaped bars 3, 4 have at least approximately the same cross sectional areas, one area being preferably within 90% of the other area. In order that this be possible with the trapezoidal slot cross-sections and the close contact with the stator teeth 6, the shaped bars 3, 4 of the given slot 8 have different shapes. As can be seen in FIG. 4, both shaped bars 3, 4 have a trapezoidal shape, but the side and height relationships of the two trapeziums are different, as a result of which the trapezoidal shapes are different. In geometrical terms, these two trapeziums are neither congruent nor similar.

Figure 5:
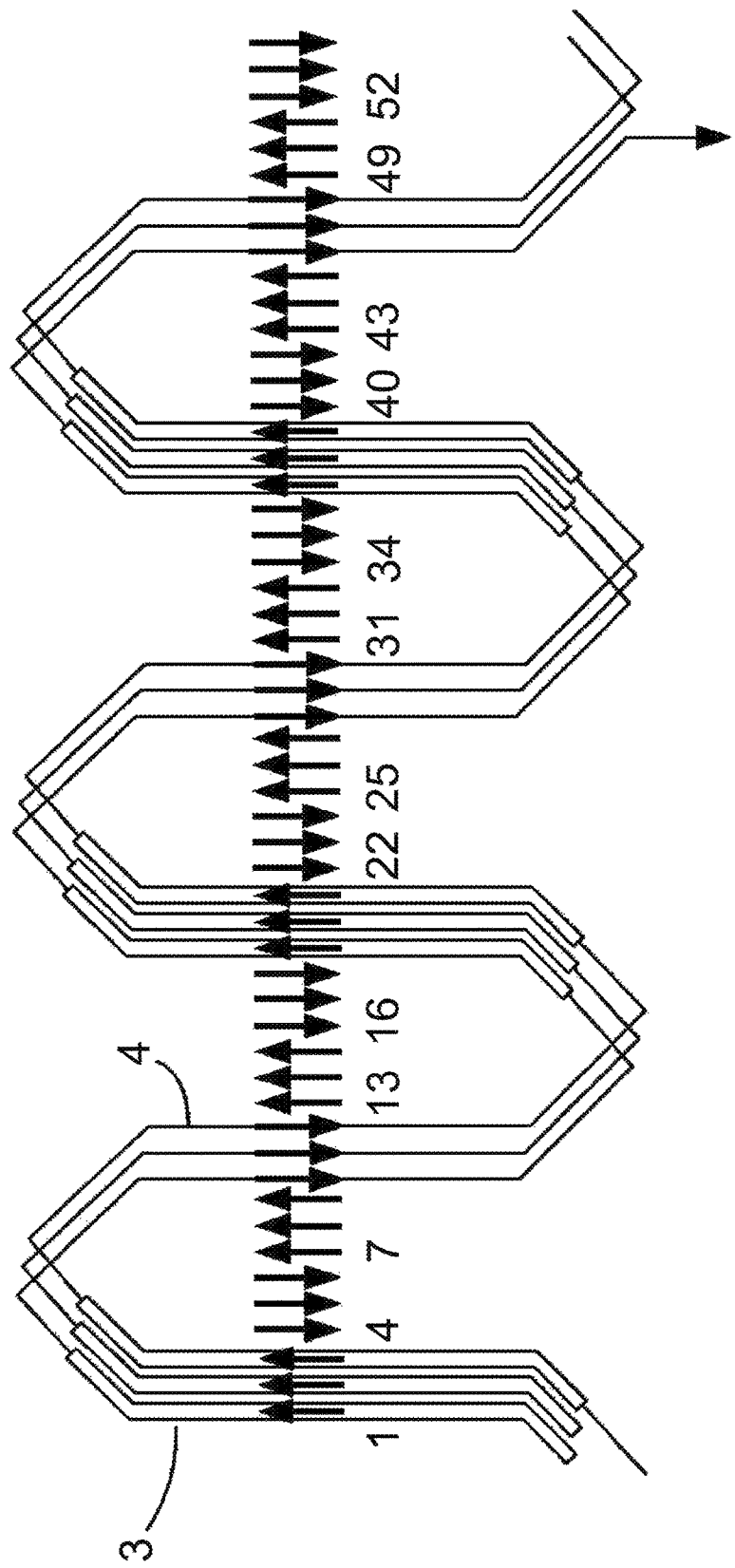
FIG. 5 shows a first group of coil elements.
Figure 6:
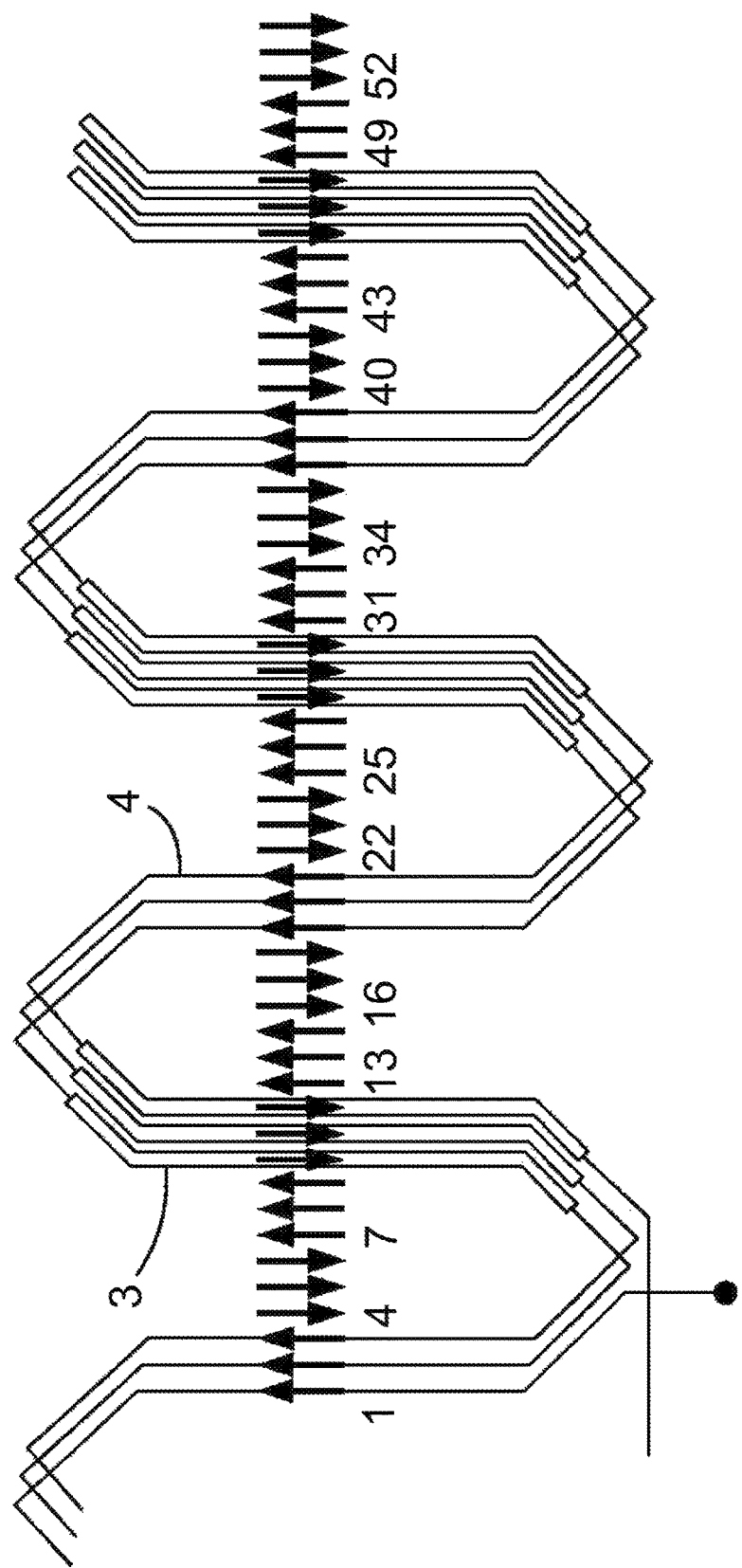
FIG. 6 shows a second group of coil elements.
Figure 7:
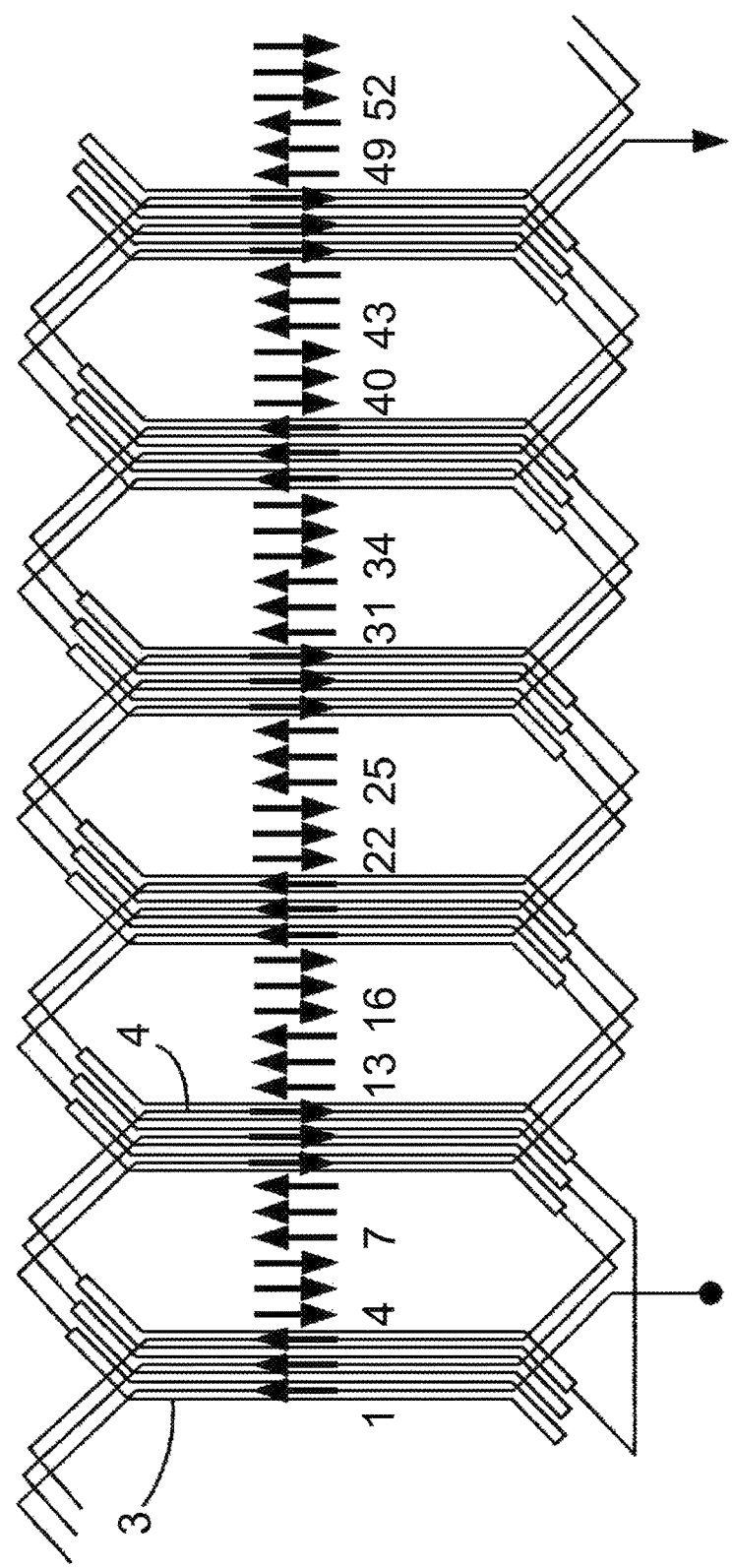
FIG. 7 shows the first and second groups of coil elements assembled to form a complete phase.

To illustrate how the shaped bars 3, 4 in the slot 8 are connected with one another, FIGS. 5, 6, and 7 show the windings that belong to one of the three phases. The windings of one phase include a first group of coil elements in accordance with FIG. 5, and a second group of coil elements in accordance with FIG. 6. In FIG. 7, the serial wiring of the groups of coil elements is represented. The shaped bars 3 represented in FIGS. 5, 6, and 7 in strip form are the lower bars, which sit in the lower layer (facing away from the rotor 2) (FIGS. 3 and 4). The shaped bars 4 represented as simple lines are the upper bars, which sit in the upper layer (facing towards the rotor 2) (FIGS. 3 and 4).

The differing representations of the upper and lower shaped bars 4 and 3, respectively, have been selected purely so as to be able to represent shaped bars running one above another in the plane of FIGS. 3 and 4. However, these differences in representation do not mean that the shaped bars 3, 4 are of differing thickness. Also the shape and position of the interfaces between upper and lower bars represented at the respective faces of the stator 1 have no deeper meaning with regard to the present invention. FIGS. 5, 6, and 7 have the sole objective of illustrating the topology and wiring of the individual shaped bars 3 and 4, and thus the course and sense of direction of the windings.

As can be seen in FIGS. 5, 6, and 7, there takes place after each pass through the stator 1, a layer change, i.e., a majority of the connections at the faces of the stator 1 connect an upper bar with a lower bar. The arrows specify the respective sense of winding, the numbers under the arrows the numbering of the slots. In the first group of coil elements in FIG. 5, the windings begin in the lower layer with slot no. 3 and end with slot no. 46, which is connected with the star point (indicated by a leading out arrow). In the second group of coil elements in FIG. 6, the windings begin in the upper layer with slot no. 1 (as indicated by a point) and end with slot no. 12, which is connected with the lower layer of slot no. 3 (FIG. 5). The upper bar of slot no. 1 is connected with the phase connection (as indicated by a point). The windings of the two groups of coil elements are serially connected with one another and along the circumference of the stator have an opposite sense of direction.

The two shaped bars 3, 4 of the slot 8 are electrically insulated from one another in their course through the slot 8, but are serially connected with one another by the multiplicity of windings. The windings of the other two phases are not represented in the interests of clarity, but can be embodied in an analogous manner.

Figure 8:
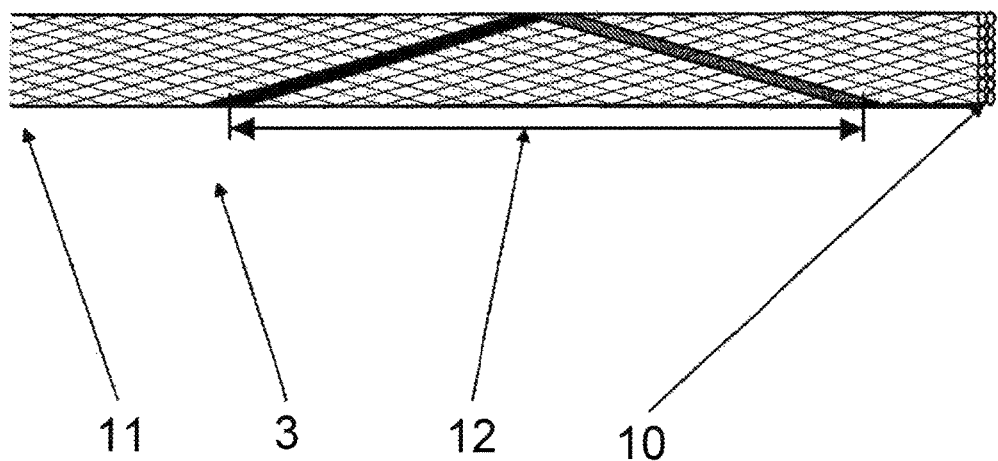
FIG. 8 shows a shaped bar in detail.

The shaped bars 3, 4 are in each case formed from a multiplicity of individual wires 10 (FIG. 8). These are preferably multiply stranded. This means that in the first instance, a group of individual wires 10 are stranded, i.e., twisted, to form a strand. In a further step, two or a plurality of these strands are then stranded, i.e., twisted, together. In this manner, multiple stranding is obtained. Other stranding cascades are possible.

In FIG. 8, one sees an inventively deployed shaped bar 3, 4 in detail. It includes a plurality of individual wires 10 that are insulated from one another and twisted. At the end 11 of each shaped bar 3, 4, these wires 10 are electrically connected (welded) together. Thus, the above-described conducting loops are formed within a shaped bar 3, 4. The lay length 12 of a twisted individual wire 10 is a length over which a complete rotation (360° mech. degrees) of the wire 10 is distributed about its own longitudinal axis.

Figure 9:
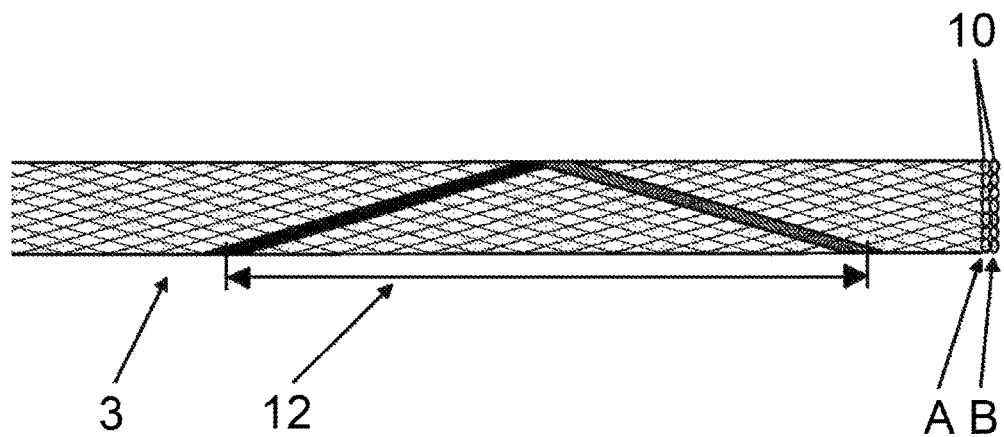
FIG. 9 shows an end of a preferred embodiment of a shaped bar in greater scale.

As can be seen in FIG. 9, each of the shaped bars 3, 4 in an advantageous embodiment includes at least two layers A, B lying above one another, the layers A, B each including a plurality of individual wires 10, which are twisted with each other and are preferably grouted. Each of the individual wires 10 comes to lie on the surface of the respective shaped bars 3, 4, with the advantage of the ameliorated cooling of the shaped bars 3, 4.

The shaped bars 3, 4 thus formed are subsequently, that is to say, after the stranding process, brought into the inventive trapezoidal shape. It has been shown that cold forming, in particular by a rolling process, has here proved itself in terms of quality and manufacturing costs.

In the course of the shaping the shaped bars 3, 4 during the production process, according to an advantageous variant of such method, the ends of the shaped bars 3, 4 are pre-bent before they are inserted into the slot 8 of the stator 1, in order to make the following step of their wiring more easy. Shaped bars 3, 4 according to such an embodiment are shown in FIG. 10.

To be able to introduce pre-bent shaped bars 3, 4 into the slots 8 more easily, broadened inner ends of the stator teeth 6 are asymmetrical in a manner that results in an essentially flat surface area on one side of the stator tooth 6 and in a broader projection 6a in the direction towards the adjacent stator tooth 6.

Figure 10:
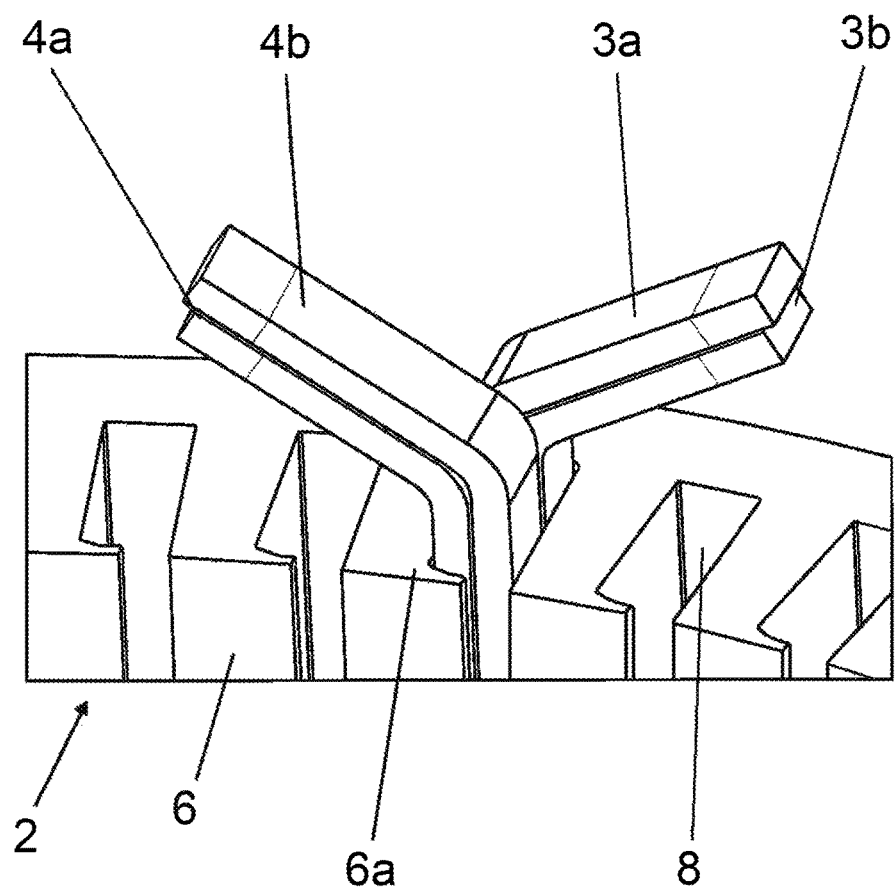
FIG. 10 shows a section of one end of the stator with a further advantageous embodiment of the shaped bars inserted into a slot of the stator.

Preferably, and as can also be gathered from FIG. 10, both shaped bars 3, 4 include at least two essentially flat partial bars 3a, 3b and 4a, 4b, respectively, which are lying closely one against the other and are connected to form the shaped bar 3 and 4, respectively. In a preferred manner, the thickness of each of the partial bars 3a, 3b, 4a, 4b is not greater than the gap width between the edge of the projection 6a of one stator tooth 6 and the adjacent edge of the adjacent stator tooth 6. Introducing the partial bars 3a, 3b, 4a, 4b into the slot 8 is done through the gap between two adjacent stator teeth 6 in the following order: firstly, the partial bar 3a is introduced, then partial bar 3b followed by partial bar 4a and finally partial bar 4b are inserted. Partial bars 3a and 4a, respectively, are each displaced in a direction oblique to the direction of their insertion, to bring them into a position behind the broader projection 6a of the stator tooth 6. Thus, the respective second partial bar 3b and 4b, respectively, can be introduced into the slot 8 with a straight-direction movement.

The shaped bars 3, 4 in each version are electrically connected with one another at the ends.

A form of connection for the individual shaped bars 3, 4 that is suitable for automotive applications is resistance welding (or thermal fusing).

This form of connection is in fact already deployed in motors in the automotive sector.

However, in the inventive special case, this form of connection is deployed for purposes of connecting the electrical conductors between the respective slots, in contrast to conventional applications, in which, e.g., the phase tappings are connected.

Thus, the difference from conventional applications is that the deflection of the current flow in the winding head is enabled by this form of connection (resistance welding), which is novel for this purpose.

Resistance welding (or thermal fusing) is an option of known art for electrical connections, which in particular finds application in the automotive sector on account of its vibration resistance and thermal shock resistance.

However, a big additional advantage of resistance welding for the present invention is that the stripping of the electrical insulation layer from the respective conductors is also included in the process, and does not have to be undertaken in advance. This is of particular advantage for the new application when connecting the electrical conductors between the respective slots, since it enables a complete connection of all conductors without the need to undertake any significant preparatory treatments. In this manner, the number of steps in the method for the manufacture of the winding can be reduced, as also can the manufacturing costs.

In order to minimise the manufacturing costs further, a continuous multiple rolling process is used.

The invention is not limited to the examples of embodiment represented. It is quite conceivable that the rotor 2 is an external rotor that surrounds the stator 1. The invention is also suitable for rotating field machines of any topology (winding path). Also, more than two shaped bars can sit in one slot.

LIST OF REFERENCE LABELS

1 Stator
2 Rotor
3 Shaped bar (lower bar)
3a, 3b partial bars
4 Shaped bar (upper bar)
4a, 4b partial bars
5 Motor
6 Stator tooth
6a projection of the stator tooth
7 Sidewalls of a stator tooth 6
8 Slot
9 Yoke height
10 Individual wires
11 End of the shaped bar
12 Lay length in a stranded/twisted shaped bar made up from a plurality of individual wires 10
A, B layers of the shaped bar.

What is claimed is:

1. A stator for an electrical machine, the stator comprising:
   a plurality of teeth disposed along a circumference of the stator, each of the teeth including sidewalls that run essentially parallel to one another, sidewalls of adjacent teeth separating the stator into a plurality of slots along the circumference of the stator; and
   at least two shaped bars disposed one above another in each of the slots, the shaped bars having different shapes and approximately same cross-sectional areas, each shaped bar of the at least two shaped bars having a length and including an arrangement of two flat layers disposed one above another as viewed in a radial direction of the electrical machine, the arrangement formed from a plurality of individual wires twisted with each other and grouted such that each wire of the individual wires lies at a surface along the length of each shaped bar, the at least two shaped bars being electrically insulated one from another in their course through each of the slots, and the at least two shaped bars being at least indirectly serially connected with one another.

2. The stator as claimed in claim 1, wherein the at least two shaped bars are disposed against the sidewalls of each of the teeth.

3. The stator as claimed in claim 1, wherein the at least two shaped bars have trapezoidal cross sections.

4. The stator as claimed in claim 1, wherein the at least two shaped bars are cold formed by rolling.

5. The stator as claimed in claim 4, wherein the at least two shaped bars comprise pre-bent end portions.

6. The stator as claimed in claim 1, wherein at least one of the at least two shaped bars comprises at least two partial bars lying closely one against another, the at least two partial bars connected to form the at least one of the at least two shaped bars.

7. The stator as claimed in claim 1, wherein a length of each of the slots of the stator is a whole number multiple of a lay length of at least one wire of the plurality of individual wires.

8. The stator as claimed in claim 1, wherein a stator pole length is between 50 and 120 mm, and stator slot cross section is between 80 and 150 mm$^2$.

* * * * *